United States Patent
Bryant et al.

(10) Patent No.: US 8,177,630 B2
(45) Date of Patent: *May 15, 2012

(54) GAMING MACHINE WITH LOYALTY BONUS

(75) Inventors: Natalie Bryant, Rosebery (AU); Olive Scott, Rosebery (AU)

(73) Assignee: Aristocrat Technologies Australia Pty Ltd. (AU)

( * ) Notice: Subject to any disclaimer, the term of this patent is extended or adjusted under 35 U.S.C. 154(b) by 903 days.

This patent is subject to a terminal disclaimer.

(21) Appl. No.: 11/856,520

(22) Filed: Sep. 17, 2007

(65) Prior Publication Data

US 2008/0004106 A1    Jan. 3, 2008

Related U.S. Application Data

(63) Continuation of application No. 10/275,234, filed on Jun. 16, 2003, now Pat. No. 7,291,068.

(30) Foreign Application Priority Data

May 3, 2000    (AU) ........................................ PQ7263

(51) Int. Cl.
    *A63F 9/24*    (2006.01)
(52) U.S. Cl. ............................................. 463/25; 463/20
(58) Field of Classification Search .................... 463/25, 463/20
    See application file for complete search history.

(56) References Cited

U.S. PATENT DOCUMENTS

| | | |
|---|---|---|
| 4,964,638 A | 10/1990 | Ishida |
| 5,645,486 A | 7/1997 | Nagao et al. |
| 5,833,540 A | 11/1998 | Miodunski et al. |
| 6,179,170 B1 | 1/2001 | Bachand |
| 6,179,710 B1 | 1/2001 | Sawyer et al. |
| 6,605,001 B1 | 8/2003 | Tarantino |
| 6,638,167 B1 | 10/2003 | Sawyer et al. |
| 6,656,047 B1 | 12/2003 | Tarantino et al. |
| 7,115,033 B1 | 10/2006 | Timperley |

(Continued)

FOREIGN PATENT DOCUMENTS

DE    3415114    10/1985

(Continued)

OTHER PUBLICATIONS

U.S. Appl. No. 09/298,604—parent of Tarantino 6605001 patent., dated Apr. 23, 1999.

(Continued)

*Primary Examiner* — Pierre E Elisca

(74) *Attorney, Agent, or Firm* — McAndrews, Held & Malloy, Ltd.

(57) ABSTRACT

A gaming machine is provided, which awards loyalty points to players playing the game who have identified themselves to the machine. The machine is arranged to award loyalty points to the player and to play two game means wherein, the first or base game may be provided by the slot machine game as a stand alone function with no dependence upon a supporting communications network, the second game may be linked game in which a plurality of network connected machines (50) participate with control of the game being provided by a central game controller (60), while the communications network (62) is controlled by a network controller (61). A first game mode is available to all players and a second enhanced game mode is made available to players who have reached a predetermined threshold of loyalty points.

20 Claims, 7 Drawing Sheets

U.S. PATENT DOCUMENTS

| | | |
|---|---|---|
| 7,419,428 B2 | 9/2008 | Rowe |
| 2002/0142846 A1 | 10/2002 | Paulsen |
| 2002/0193160 A1 | 12/2002 | Tarantino |
| 2003/0032474 A1 | 2/2003 | Kaminkow |
| 2003/0036425 A1 | 2/2003 | Kaminkow et al. |
| 2003/0050831 A1* | 3/2003 | Klayh ............................ 705/14 |
| 2003/0232640 A1 | 12/2003 | Walker et al. |
| 2004/0038736 A1 | 2/2004 | Bryant et al. |
| 2004/0077422 A1 | 4/2004 | Bryant et al. |
| 2005/0054429 A1 | 3/2005 | Baerlocher et al. |
| 2005/0054439 A1 | 3/2005 | Rowe et al. |
| 2006/0040734 A1 | 2/2006 | Baerlocher et al. |
| 2006/0046832 A1 | 3/2006 | Isogai et al. |
| 2006/0068883 A1 | 3/2006 | Randall et al. |
| 2006/0089195 A1 | 4/2006 | Walker et al. |
| 2006/0287035 A1 | 12/2006 | Walker et al. |
| 2007/0117641 A1 | 5/2007 | Walker et al. |
| 2008/0051193 A1 | 2/2008 | Kaminkow et al. |
| 2008/0103909 A1 | 5/2008 | Huang et al. |
| 2009/0069087 A1 | 3/2009 | Kelly et al. |
| 2009/0131142 A1 | 5/2009 | Kelly |
| 2009/0131175 A1* | 5/2009 | Kelly et al. ...................... 463/42 |
| 2009/0176580 A1* | 7/2009 | Herrmann et al. .............. 463/43 |
| 2009/0197671 A1 | 8/2009 | Kelly et al. |
| 2010/0029376 A1* | 2/2010 | Hardy et al. ..................... 463/25 |
| 2010/0160035 A1* | 6/2010 | Herrmann ....................... 463/25 |
| 2010/0198674 A1* | 8/2010 | Boucard .................... 705/14.25 |
| 2010/0311496 A1* | 12/2010 | Taylor et al. .................... 463/25 |

FOREIGN PATENT DOCUMENTS

| | | |
|---|---|---|
| DE | 3917683 | 12/1990 |
| DE | 4200254 | 8/1993 |
| EP | 0360613 | 1/1995 |
| GB | 2282690 | 4/1995 |
| JP | 6254234 | 9/1994 |
| JP | 6277335 | 10/1994 |
| JP | 6285243 | 10/1994 |
| JP | 10151271 | 6/1998 |
| WO | 0003775 | 1/2000 |

OTHER PUBLICATIONS

Office Action of U.S. Appl. No. 10/275,234, dated Oct. 27, 2006.

Office Actions of U.S. Appl. No. 12/173,671, dated Apr. 9, 2009, Aug. 27, 2009 and Mar. 19, 2010.

Office Actions of U.S. Appl. No. 12/173,645, dated Apr. 2, 2009, Sep. 10, 2009, and Mar. 2, 2010.

Office Actions of U.S. Appl. No. 12/173,640, dated Jun. 9, 2009, Mar. 24, 2010, and Jul. 30, 2010.

Office Action of U.S. Appl. No. 12/173,687, dated Jul. 18, 2011.

Third Party Submission in Published Application Under 37 C.F.R. 1.99 filed with the United States Patent and Trademark Office, Marvin A. Motsenbocker, dated Nov. 8, 2011, pp. 1-21.

* cited by examiner

```
                TOTAL POINTS 36
             BONUS STARTS AT 1000 POINTS
   CREDIT 615       BET 20      WIN 55
```

| 10 | B | 10 | Q | B |
|----|---|----|---|---|
| K  | K | K  | S | A |
| S  | C | C  | J | K |

```
             29 BONUS GAMES REMAINING
```

FIG. 7

```
                TOTAL POINTS 56
             BONUS STARTS AT 1000 POINTS
   CREDIT 605       BET 20      WIN 10
```

| C | J | A  | 10 | J  |
|---|---|----|----|----|
| 9 | 9 | 9  | J  | A  |
| A | Q | 10 | Q  | 10 |

```
             28 BONUS GAMES REMAINING
```

FIG. 8

GAMING MACHINE WITH LOYALTY BONUS

The present invention relates to gaming machines of the type generally known as slot machines, fruit machines, card machines or poker machines and in particular, the invention provides an improvement whereby players are rewarded for frequenting a particular establishment.

BACKGROUND OF THE INVENTION

Gaming machines are typically installed in large numbers at casinos and clubs which compete against one another for the custom of patrons wishing to play their games. Typically, this competition involves providing attractions such as the latest games, promotions associated, with or additional to the games played on their gaming machines and large incrementing bonus jackpots.

These attractions work to some extent, but the smart gamblers choose to play at establishments based on the current promotions that are being run, or the current size of the incrementing jackpots, and so there is a certain fluctuation in patronage due to the fickle nature of the patrons and the changing attractions of the promotions being run.

Some establishments have addressed this problem over the years by providing loyalty schemes. There exist many different systems used by clubs and casinos where regular players are rewarded. Some are manual where players that are recognised as spending a lot of time playing the machines are given free meals or discounts. More sophisticated systems involve players being sold or given a plastic card (eg. magnetic stripe or smartcard) that they can insert into a special reader on the gaming machines at the applicable club/casino. Points are accumulated at a fixed rate and stored on the card or in a central account. When the player accumulates a fixed number of points they become eligible to redeem them in exchange for goods. Players are usually given a range of goods to choose from where the number of points that need to be redeemed for each item varies depending upon the value of the item.

SUMMARY OF THE INVENTION

The present invention provides a gaming console having a display means, player input means, loyalty points accumulating means and control means arranged to control images displayed on the display means in response to player inputs and game outcomes of games run on the console by the player and to award loyalty points to the player which are recorded as a loyalty points value, the console being characterised in that it is arranged to operate in at least two modes, including a first normal mode and a second loyalty enhanced mode, wherein the first mode is available to all players and the second mode is made available only to players who have established a loyalty points value greater than or equal a predetermined level of loyalty points.

In various embodiments of the invention, the second mode may be distinguished from the first mode by providing higher prizes or additional prizes, allowing additional game features either as standard features, or as purchasable features within a standard game, or by providing eligibility to additional feature games, and bonus or jackpot prizes.

In the preferred embodiment, the main, or base game will be a card game or spinning reel game with or without additional feature games, but may also be a keno or bingo game, or any other game which can be provided on a gaming console of this type.

The loyalty points may be accumulated and recorded on the player's identification card, in which case, the loyalty system may be implemented on "stand alone" consoles. Alternatively, in the case of networked consoles, the tracking of player points can be done on a network server, or a dedicated loyalty system server for example, and the player identification card can be used only to identify the player to the system.

In the case where the second mode provides a feature game, the feature game may be an independent second screen game. Alternatively, a bonus feature may be related to particular outcomes on the main game, such as providing prizes for outcomes over a certain level or containing certain indicia. The loyalty feature may also be related to a system event in a linked system and may for example, involve providing eligibility to a progressive jackpot.

Some specific examples of bonus rewards that can be provided to a player when their accumulated loyalty points exceed the predetermined level may include:
 a) 10 free games are awarded.
 b) Pay a bonus of 5 credits for every KING that appears in the next 20 games.
 c) A second screen feature is awarded, which pays a bonus prize.

BRIEF DESCRIPTION OF THE DRAWINGS

Embodiments of the invention will now be described by way of example with reference to the accompanying drawing in which:

FIGS. 5, 6, 7 & 8, are game screens illustrating a game sequence which demonstrates the invention.

DETAILED DESCRIPTION OF THE PREFERRED EMBODIMENT

In the following detailed description the methodology of the embodiments will be described, and it is to be understood that it is within the capabilities of the non-inventive worker in the art to introduce the methodology on any standard processor-based gaming console by means of appropriate programming.

Figure 1:
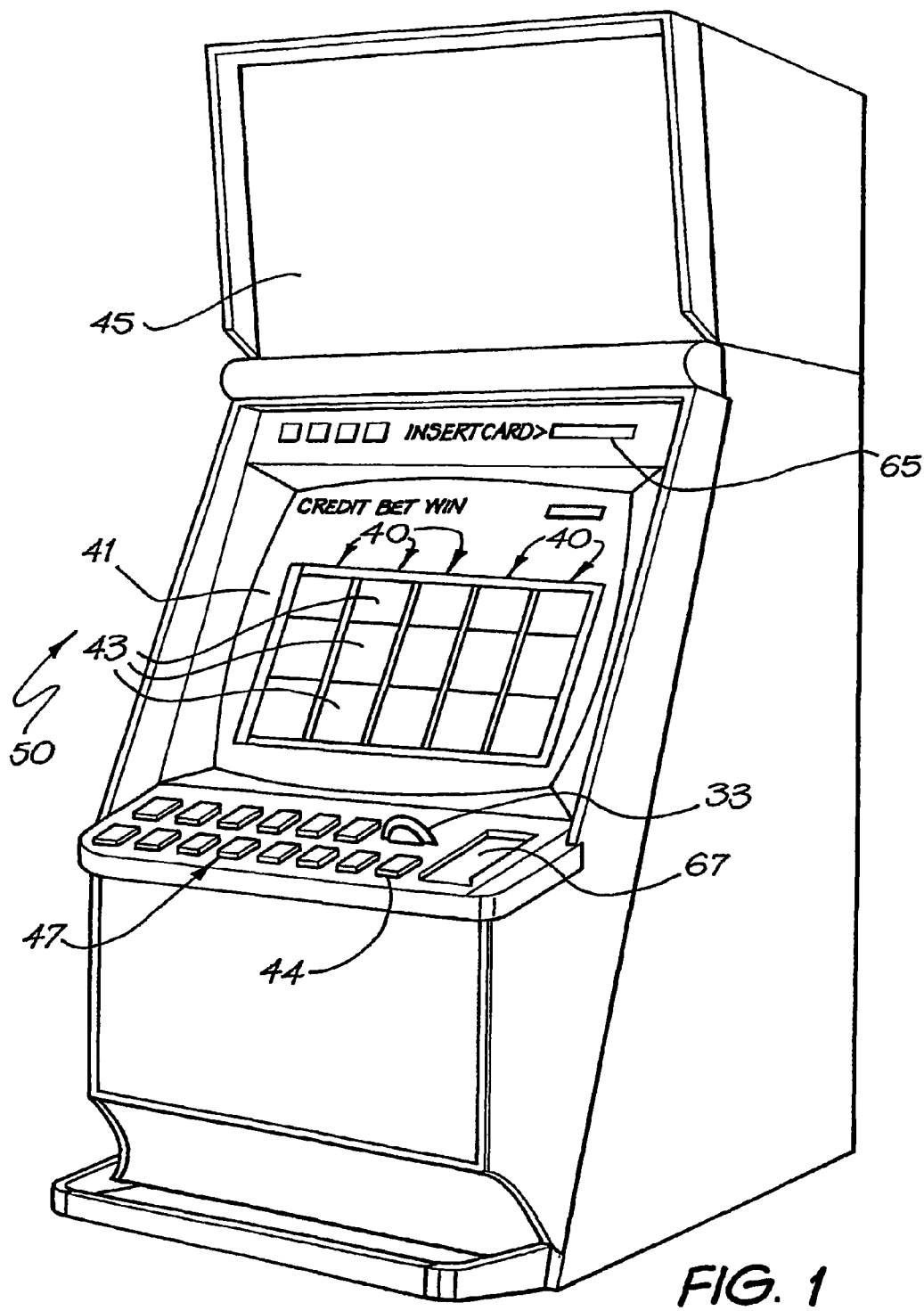
FIG. 1 illustrates a conventional video slot machine on which the embodiment of the present invention is provided.

Referring to FIG. 1 of the drawings, a first embodiment of the invention is implemented in relation to a slot machine 50 of the type having a video display illustrating a plurality of rotatable simulated reels 40 carrying symbols 43. During a game, the plurality of simulated reels are spun and when the reels stop spinning, a part of each reel is visible displaying a subset of the symbols on the respective reel. The console is arranged to pay a prize on the occurrence of a predetermined symbol or combination of symbols appearing together on the visible parts of the reels.

The prize paying combinations can be any of the combinations found on known spinning reel style slot machines, or may be a new set of combinations derived specifically for machines according to the invention.

In the slot machine 50 illustrated in FIG. 1, the game is initiated by pressing a button 44, however, it will be recognised by persons skilled in the art that this operating mechanism might be replaced by a pull handle actuator, or a touch screen sensor, in other embodiments of the invention. Credit is established on the slot machine by inserting coins into the coin slot 33, inserting a banknote or ticket into the bill acceptor 67 or possibly by inserting a card into the card reader and transferring credit either from an account held at the casino or at a financial institution or by transferring a credit from a stored value on the card itself.

The top box 45 on top of the slot machine 50 displays the various winning combinations for which a prize is paid on this machine.

In the embodiment of FIG. 1 a series of function switches 47 are also provided for selection of the bets and lines to be included in the game.

Games provided in embodiments of the present invention are modified versions of the current genre of Multiline 5 Reel Video games. These games operate on a video screen 41 displaying 5 separate reels 40. Referring specifically to the embodiment of FIG. 1, three symbols 43 from each of the video reel strips are viewed on screen at any one time, for each of the 5 reels. The players have an option of playing 1, 3, 5, 7 or 9 different lines.

While the slot machine illustrated in FIG. 1 is of the simulated-spinning reel type, the present invention is equally applicable to any type of game found on the current generation of video slot machines and could also be applied to physical reel machines. The primary game of the slot machine will operate in the conventional manner and its operation will not be described in detail.

Figure 2:
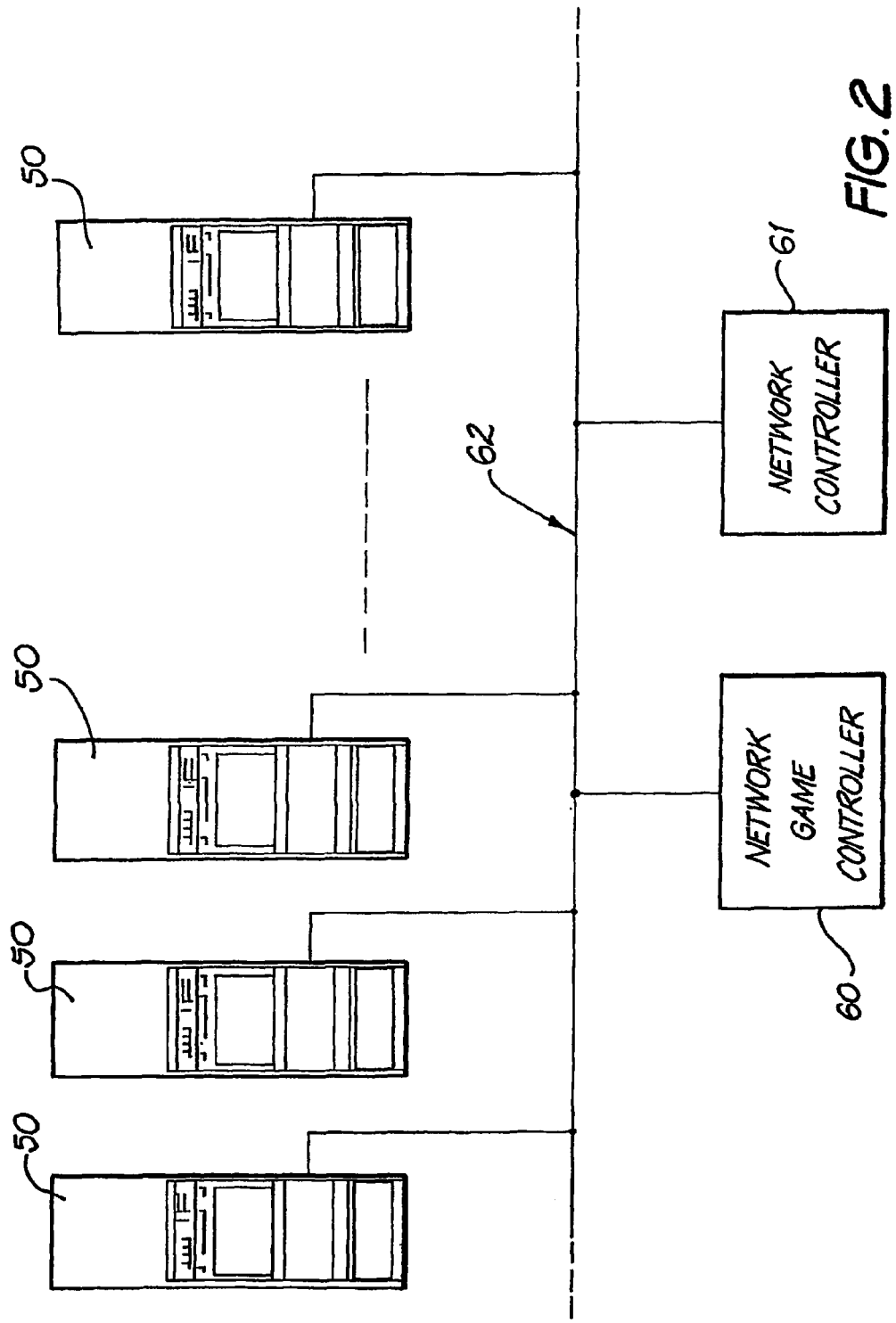
FIG. 2 schematically illustrates a network of gaming machines.

Referring to FIG. 2, a number of gaming consoles 50 are preferably connected in a network via a communications system 62, and the network controller 61. A network game controller 60 is also provided on the communications network 62 to control the accumulation of linked progressive prizes and the awarding of jackpots.

In a networked embodiment such as that shown in FIG. 2, the loyalty points accumulation may be implemented on either the network controller 61 or, the network game controller 60 or, alternatively a separate dedicated server (not shown) could be used to implement the loyalty points recording system. Alternatively in a stand alone embodiment the functionality of the loyalty system is built into the controller of the gaming console itself. In such a system the points will be accumulated by the console and stored on the players identification card rather than at a central controller.

Figure 3:
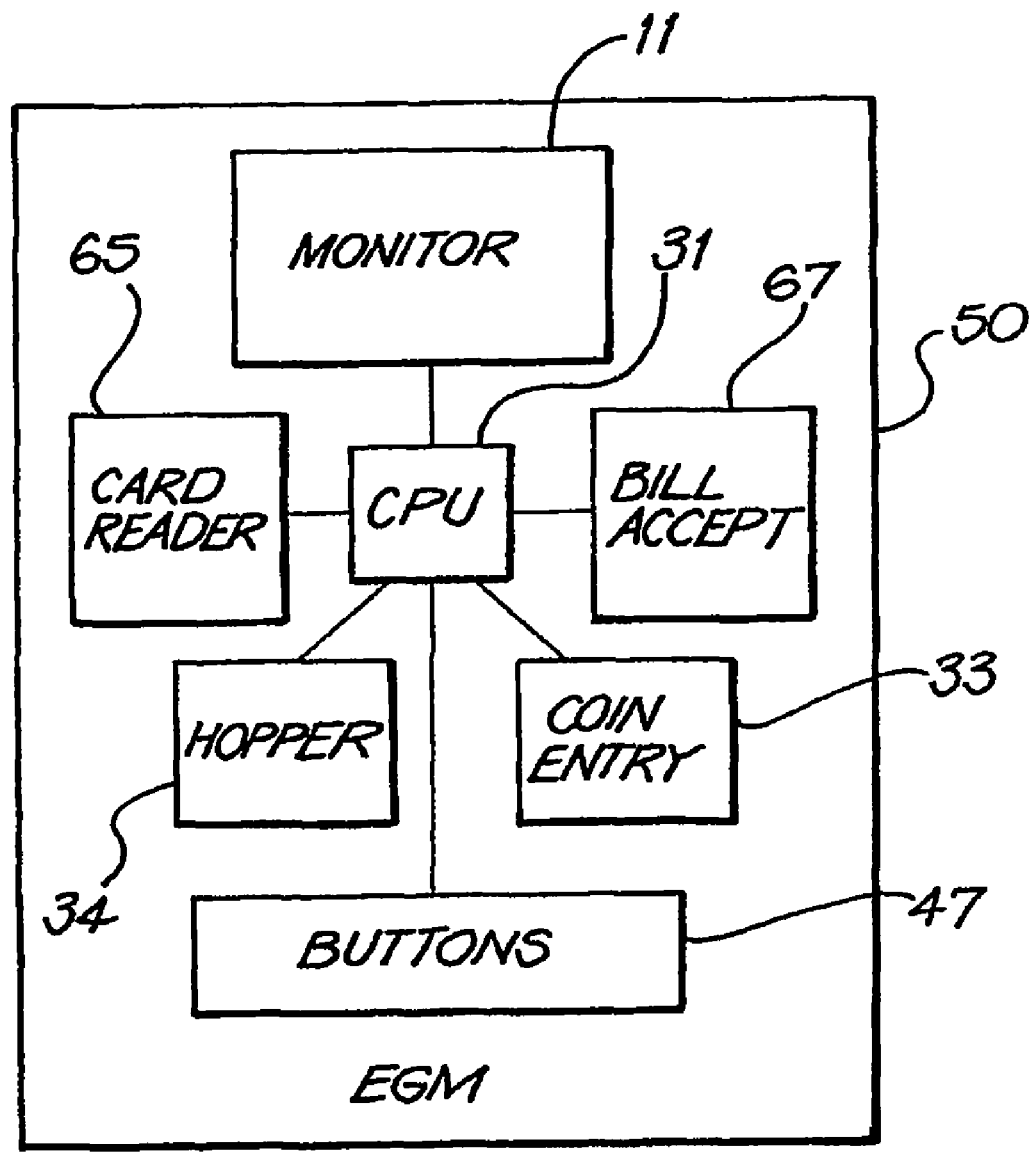
FIG. 3 is a block diagram of the gaming machine of FIG. 1, showing major functional elements.
Figure 4:
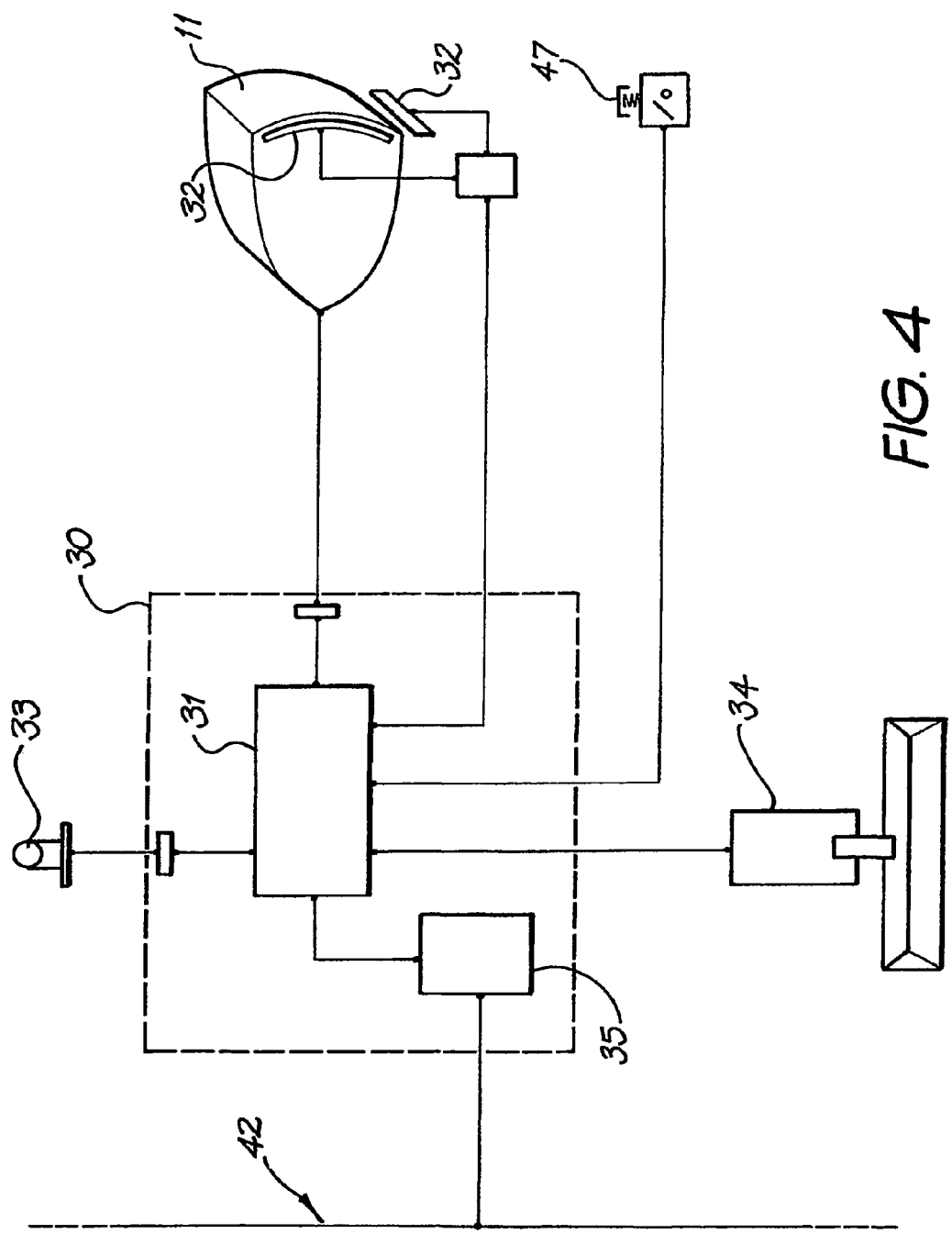
FIG. 4 is a further block diagram of a slot machine of FIGS. 1 and 3, showing optional touch screen and network connection functions.

The program to implement the base game described above, and to provide the normal mode of operation and the loyalty enhanced mode, runs on a standard gaming console control processor 31 as illustrated schematically in FIGS. 3 and 4. This processor forms part of a controller 30 which drives the display screen 11 and receives player input signals from push-button switches 47. Alternatively, player inputs may be made by way of touch input signals from touch sensors 32. The console also receives coin input pulses from a coin chute mechanism 33 to establish a player credit and includes a coin payout mechanism or hopper 34. Connection to the communications network 42 is via a network interface 35.

The operation of the loyalty points system is split between the game console 50 and the network game controller 60 with points allocation functions and reward game features being provided within the game console 50 and points accumulation and recordal being performed on the central game controller with the points information being passed to each participating machine 50 via the network 62.

Referring again to FIGS. 1 and 3, each of the gaming machines within a gaming venue will preferably have a card reader 65 installed. Players are able to insert a loyalty card (smartcard or magnetic stripe card) into a gaming machine when they play, and a percentage of the amount that they bet will be added onto the card (ie a typical point collecting loyalty system), or collected in a loyalty points account on a network server such as the network controller 61 of FIG. 2. In the case where points are stored on a network server, player identity may be established via a number of possible mechanisms including, the insertion of an Identity Card or Key in a reader on the machine, keying in of a PIN number on a keypad provided on the machine, or player details could be obtained as part of another activity such as cashless gaming funds transfer. However, it is not essential to identify the player in order to reward player loyalty and players may be issued with cards or other identifying devices that do not provide player identity information but instead just carry the players loyalty points. Alternatively the identifying device might provide an account identifier to allow a loyalty points account to be stored on a network computer. Finally, in cases where a physical identification device is not accessible by the console, some embodiments may permit the player the player to accumulate loyalty points during the period of play on a given console only and any points would be automatically cancelled when the credit meter in the console reaches zero.

Whenever the number of points stored on a player's card or account reaches a pre-determined threshold level, a bonus game will commence after the current game has completed. This bonus game may be a secondary game that is independent of the base or main game, but in the preferred embodiment, the bonus game is an extension to the base game being played. For example, the bonus game may involve 10 credits being awarded for every King (K) symbol that appears on the screen in any one of the next 30 games played. Note that this feature may also be triggered by a conventional trigger in addition to a trigger based on the points level, however, it is preferred that the loyalty points threshold will provide the only method of triggering the feature.

When the feature is triggered to occur as a result of points level, the current game will be completed, and the gaming machine will deduct the required number of points (ie the threshold level) from the players' card or account. The bonus feature will then commence, during which any bets made by the player will still increment the points level on the players' card by the pre-determined percentage.

Figure 5:
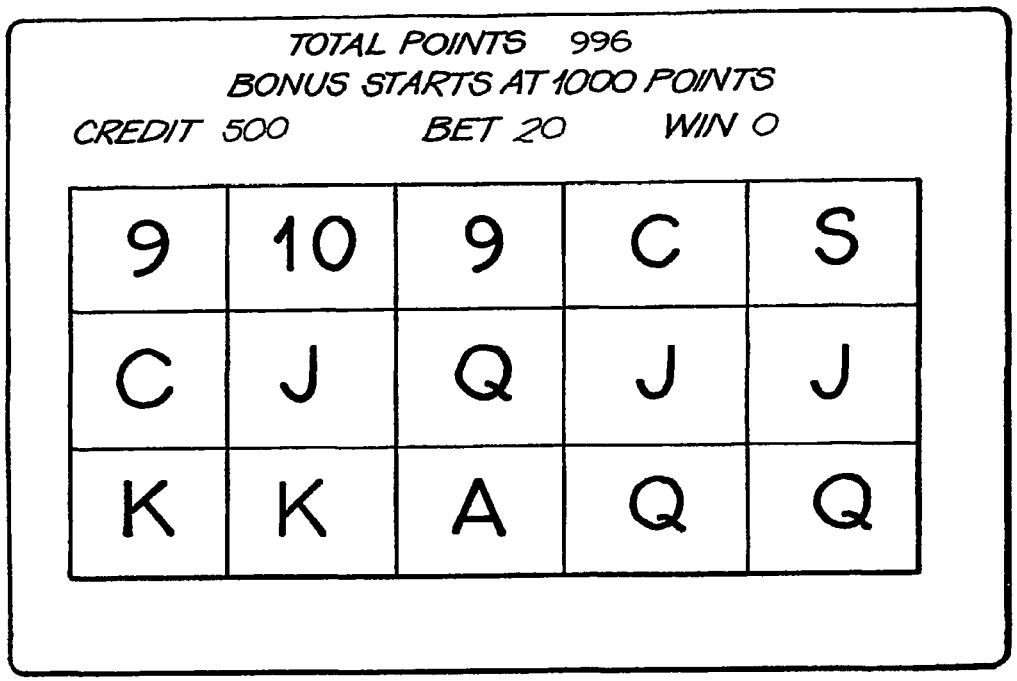

For example, a player may have their card inserted into a gaming machine with the screen of FIG. 5 appearing.

Due to the nature of this type of loyalty system, it is possible that the increment rate for the points on the card or, loyalty account may actually be 100% of the amount bet, although this is not mandatory. For the present example however, it is assumed that the points will increment at a rate of 1 point for every credit bet on the gaming console in which the card is inserted.

Figure 6:
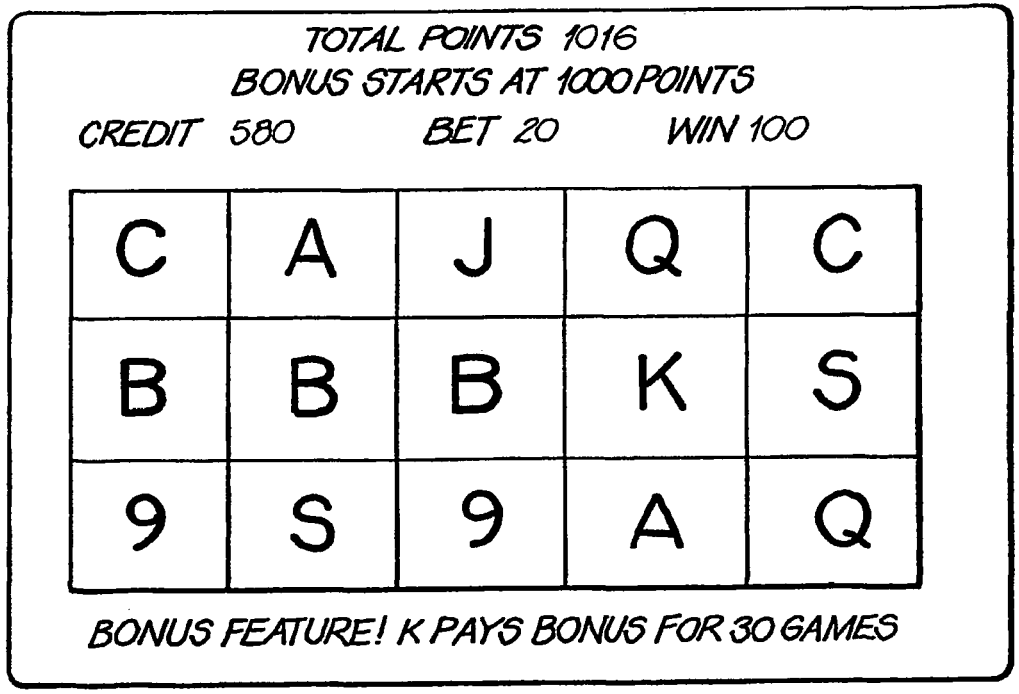

By making a bet on the base game of 1 credit per line on 20 lines, the player will exceed the threshold level of points required to be entitled to be eligible for the bonus feature as illustrated in FIG. 6. Assuming that the combination of 3×B on line 1 in FIG. 6, paid 100 credits in the base game.

FIG. 7, illustrates the first game of the bonus feature, in which the player wins 15 credits for 3×K, plus an additional 10 credits for every K on the screen, giving another 40 credits for the bonus feature.

Turning now to FIG. 8, in the second bonus game, the player has no advantage from the bonus feature because no K's appear on the screen. However, 10 credits are awarded for 3×9s from the base game.

Figure 9:
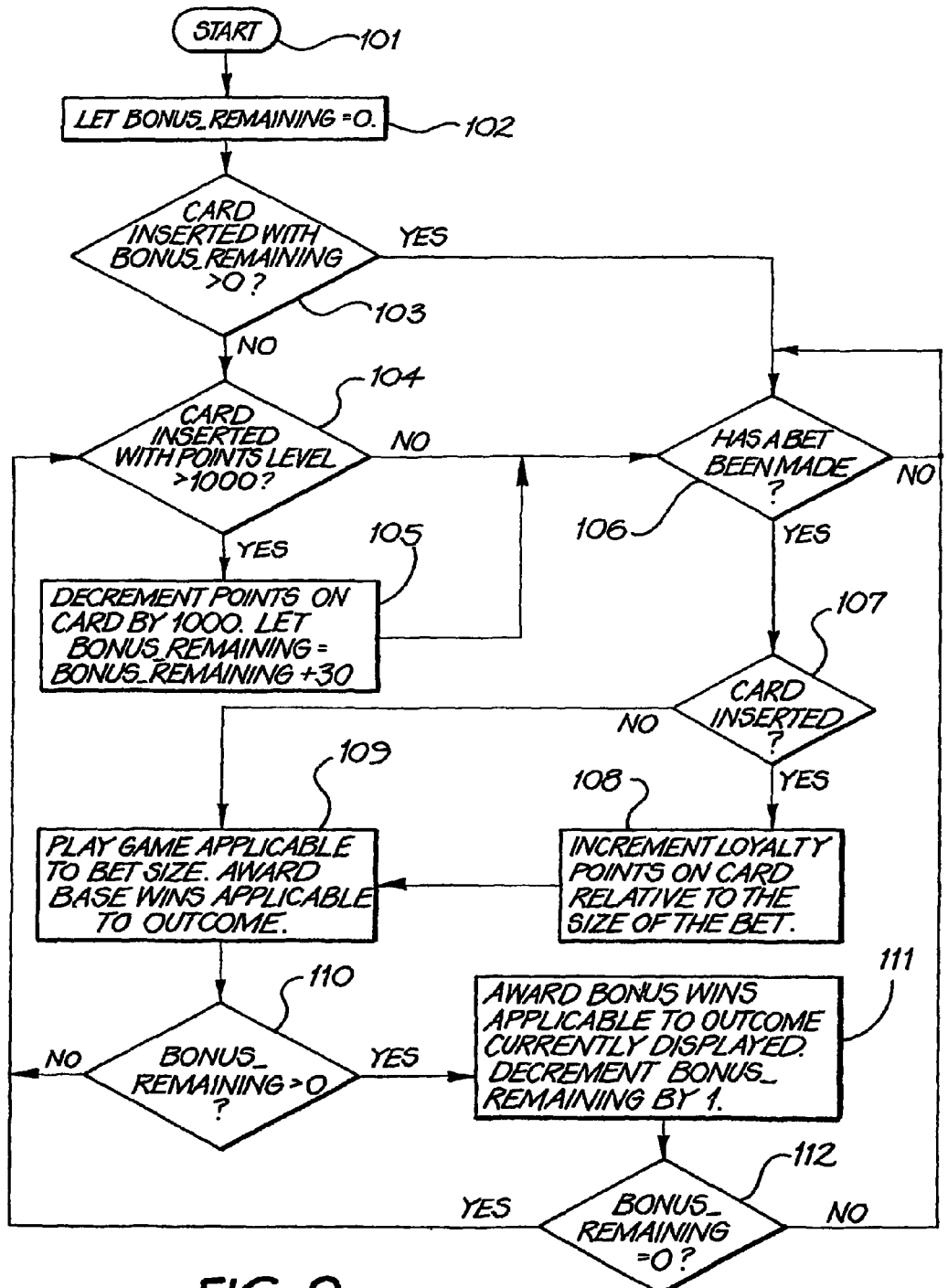
FIG. 9 is a flow chart showing the maintenance of points for a player.

Referring to FIG. 9, a flowchart of the reward process is illustrated. In this process the steps START (101) and Let BONUS_REMAINING=0 (102), are initialisation steps performed when a player establishes a credit on the console by inserting cash or transferring credit to the console. In step 103, the player loyalty system records are read and the value of BONUS_REMAINING (which keeps a count of the unplayed bonus games remaining for this player) is updated with a corresponding value stored in the player's loyalty data. The value of BONUS_REMAINING is then checked to see if any unplayed bonus games are outstanding and if so, the console commences play at step 106 in bonus mode. Alternatively, the player loyalty points information is checked at step 104 to see if the player's points are above the threshold level of 1000, in which case, the console switches into the loyalty enhanced bonus mode and the player's loyalty points are decremented by 1000 at step 105 and the player loyalty points record is updated on the card or on the server as the case may be. The console again commences play at step 106 in bonus mode. After a bet is made at step 106, the console checks for the presence of a player identification card at step 107 and if present, the player loyalty points are incremented at step 108. The game is then played in step 109 and any standard prizes are awarded. The console then tests for bonus games remaining at step 110 and if greater than zero, bonus wins are awarded at step 111, and the BONUS_REMAINING counter is decremented and the value recorded in the player loyalty records.

The BONUS_REMAINING counter is then tested again in step 112 and if greater than zero, a new game is commenced at step 106 in bonus mode. Alternatively, if the BONUS_REMAINING counter is zero, the player loyalty points are tested again at step 104 to see if the threshold has been exceeded, enabling bonus mode to commence/continue before commencing a new game at step 106. This process assumes that the player will automatically be taken into bonus mode each time the loyalty points exceed the threshold. It is possible however, for the player to be given control over entry into bonus mode once qualification is achieved, in which case, additional steps would be required between step 104 and 105 to allow the player choice to be recorded.

The bonus feature may also be available as a standard feature of the base game, such that other triggers (eg; combination triggers) in the game itself, may cause the feature to be invoked. The feature may be game specific, where a certain number of points collected will award a bonus feature that is built into the game and usually triggered by a certain random event or combination trigger. This could happen automatically when the number of points reaches the required level. Alternatively, the player may be allowed to accumulate as many points as they like so that they can play any bonus features that are owing to them at a time of their choosing. Hence the effect on the game will be that there are two ways that the game specific feature could be triggered—either by a random triggering event or by an accumulation of a fixed number of points. This also means that the expected return to player percentage for a player of the applicable gaming machines will be higher for a player taking part in the loyalty system than for one that is not.

The same approach could also be applied where the bonus is generic to all of the gaming machines that participate in the points collection scheme. For example, a linked, progressive jackpot system may allow players to play the linked bonus feature when a certain number of points have been accumulated. Again, this would mean that there are two possible ways of triggering the linked progressive jackpot on the system—the usual random turnover-based trigger or the individual point accumulation. Similarly there could be a dedicated feature associated with the participating gaming machines that could be either game specific or generic that is only available to players redeeming points. Hence players who do not use the points reward system will never be eligible to play that particular feature.

A new method of incrementing points can also be used. That is, rather than points being incremented as a fixed percentage of turnover as for prior art systems, the points could be accumulated by other means. One method is to adjust the percentage increment for different bet levels in a way that is not directly proportional to the amount bet. For example, a bet of a single credit may add 0.01 points to the player's card or account and hence 100 single credit bets would add 1 credit. However, if the player were to make a single bet of 100 credits in one hit then 2 points may be added instead of 1.

In another embodiment, the incrementing of player loyalty points may be completely unrelated to turnover. For example, the points may be related to wins or losses. Every non-winning game may add one point, or alternatively when wins occur the same number of credits as were won may also be added to the player's card or account.

Of the many types of features possible, some can be an extension to the base game. For example in a standard keno game 20 numbers are selected from a total of 80 and, if they match certain of the numbers that the player selected, a prize is awarded. When the player inserts their card and they have reached the loyalty points threshold, the same keno game will allocate 21 numbers from the 80 for the next 50 games. That is, the apparent probability of a win will be increased by giving the player an extra number for every game. (Note that in some embodiments the probability may or may not be actually increased, but the player perception will be that the loyalty system results in a higher win probability).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming console for playing at least a game, having a display, a player input, and a control arranged to control images displayed on the display means in response to player inputs and game outcomes of games run on the console by the player and to award loyalty points to the player which are recorded as a loyalty points value, the console is arranged to operate in at least two modes including a first normal mode having standard game features and a second, loyalty enhanced mode, wherein the second mode is made available only to players who have established in a loyalty system, a loyalty points value greater than or equal to a predetermined level of loyalty points and wherein the second mode differs from the first mode in that instances of the game being played while the console is operating in the second mode are provided with enhanced or additional game features with regard to the features of the first mode and on each occasion that a game is played while the console is operating in the second mode the current value of loyalty points held by the player is decreased by the predetermined value.

2. The gaming console as claimed in claim 1, wherein the second mode is distinguished from the first mode by providing higher prizes.

3. The gaming console as claimed in claim 1, wherein the second mode is distinguished from the first mode by providing additional prizes.

4. The gaming console as claimed in claim 1, wherein the second mode is distinguished from the first mode by providing additional game features as standard features of the game.

5. The gaming console as claimed in claim 1, wherein the second mode is distinguished from the first mode by providing additional, purchasable, game features within a standard game.

6. The gaming console as claimed in claim 1, wherein the second mode is distinguished from the first mode by providing a higher probability of winning a prize in an otherwise standard game.

7. The gaming console as claimed in claim 1, wherein the second mode is distinguished from the first mode by providing a predetermined number of free games on the occurrence of a predetermined trigger occurring in an otherwise standard game.

8. The gaming console as claimed in claim 1, wherein the second, loyalty mode includes a feature that is related to a system event in a linked system.

9. The gaming console as claimed in claim 8, wherein the second, loyalty mode provides eligibility to a progressive jackpot.

10. The gaming console as claimed in claim 1, wherein the second mode is distinguished from the first mode by providing eligibility to an additional bonus feature.

11. The gaming console as claimed in claim 10, wherein the bonus feature is related to particular outcomes on the main game.

12. The gaming console as claimed in claim 11, wherein a main game available for play on the console is spinning reel game in which a plurality of reel strips carrying symbols are spun and when the reel strips stop spinning part of each reel strip is displayed and prizes awarded for predetermined combinations of symbols appearing together in the displayed parts of the reel strips.

13. The gaming console as claimed in claim 12, wherein bonus available in the second, loyalty mode comprises awarding a predetermined number of free games on the occurrence of a predetermined trigger occurring in a standard game.

14. The gaming console as claimed in claim 11, wherein the additional bonus feature provides additional prizes from outcomes over a predetermined level.

15. The gaming console as claimed in claim 11, wherein the additional bonus feature provides additional prizes for outcomes containing a predetermined indicium.

16. The gaming console as claimed in claim 10, wherein the bonus feature comprises an additional feature game.

17. The gaming console as claimed in claim 16, wherein the additional feature game is an independent second screen game.

18. The gaming console as claimed in claim 1, wherein the function of standard game features is altered when the console is operating in the second, loyalty enhanced mode.

19. The gaming console as claimed in claim 18, wherein a standard game feature comprises awarding a bonus on the occurrence of a predetermined trigger and in the second, loyalty enhanced mode the bonus is increased.

20. The gaming console as claimed in claim 18, wherein the bonus comprises awarding a second screen feature.

* * * * *